United States Patent

Shanks et al.

[11] Patent Number: 5,861,993
[45] Date of Patent: Jan. 19, 1999

[54] APPARATUS FOR DISPLAYING AN IMAGE

[75] Inventors: Ian Alexander Shanks, Bedford, United Kingdom; Christoph Dobrusskin, Eindhoven, Netherlands

[73] Assignee: Central Research Laboratories Limited, Hayes, England

[21] Appl. No.: 663,040

[22] PCT Filed: Nov. 29, 1994

[86] PCT No.: PCT/GB94/02611

§ 371 Date: Aug. 1, 1996

§ 102(e) Date: Aug. 1, 1996

[87] PCT Pub. No.: WO95/16935

PCT Pub. Date: Jun. 22, 1995

[30] Foreign Application Priority Data

Dec. 13, 1993 [GB] United Kingdom .................. 9325433

[51] Int. Cl.⁶ .................................................. G02B 27/14
[52] U.S. Cl. .......................... 359/629; 356/630; 356/633
[58] Field of Search ..................................... 359/629, 630, 359/633

[56] References Cited

U.S. PATENT DOCUMENTS 5,583,695  12/1996  Dobrusskin .............................. 359/630
5,585,967  12/1996  Monroe ................................... 359/629

Primary Examiner—Frank G. Font
Assistant Examiner—Reginald A. Ratliff
Attorney, Agent, or Firm—Evenson, McKeown, Edwards & Lenahan, PLLC

[57] ABSTRACT

Apparatus for displaying an image suspended in space above a horizontal surface such as a tabletop or vehicle dash-board, of an original image below the surface, comprises a beam-splitter window in the surface and a retroreflector below the surface in a path for light reflected by the beamsplitter. The original image may for example be a VDU screen or vehicle instrument panel.

4 Claims, 2 Drawing Sheets

APPARATUS FOR DISPLAYING AN IMAGE

This invention relates to apparatus for displaying an image of an object, comprising a beam splitter being positioned in a path for light from the object, and retroreflector means being positioned in a path for light from the object which has been reflected by the beam splitter.

Such an arrangement is disclosed in EP0460873 and in W087/00328. The image appears to be suspended in space and may appear to be three dimensional.

According to the present invention, there is provided an apparatus as defined in the first paragraph, characterised in that the retroreflector means comprises a plurality of retroreflective surfaces opposing one another such that the image may be viewed from a plurality of predetermined directions.

This apparatus may be used, for example, for displaying an image of a VDU above a table top, or for displaying an image of a dashboard display of a vehicle.

Embodiments of the invention will now be described, by way of example only, with reference to the accompanying diagramatic drawings, in which FIGS. 1, 2, 3 and 5 are included for the purposes of description only and are not within the scope of the present invention the Figures:

Figure 1:
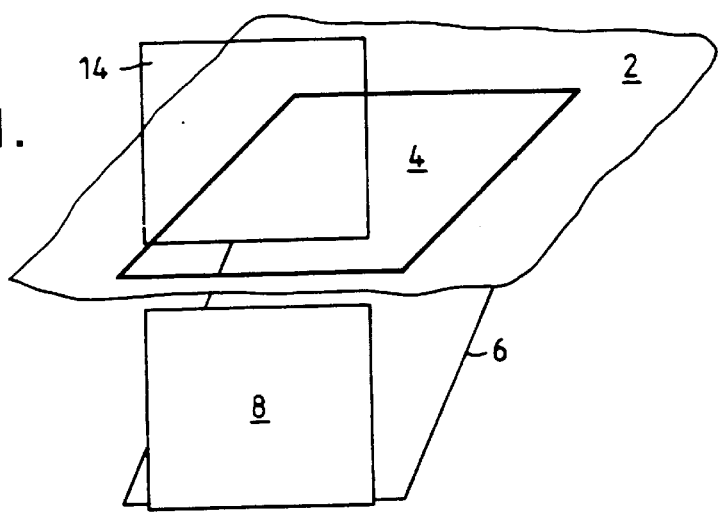
FIG. 1 is perspective view of an apparatus for displaying an image.
Figure 2:
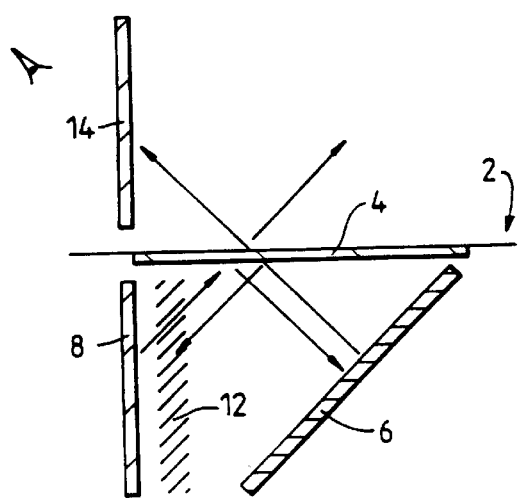
FIG. 2 is a cross sectional side view of the apparatus of FIG. 1.

Referring to FIGS. 1 and 2, an opaque surface 2 such as a tabletop, shown broken away, includes a beamsplitter window 4 mounted in an aperture therein. In this embodiment, retroreflector means comprising an array of retroreflectors, such as a sheet 6 of corner-cubes, is positioned in a path for light which has been reflected by the beamsplitter 4. In this example it is positioned at an acute angle thereto, which is about 45°, so as to form the second side of a triangle therewith. An object 8 such as a picture displayed on a VDU screen is positioned along the third side of the triangle, in this example at about 90° to the beamsplitter. Alternatively, the screen may be positioned parallel to the beamsplitter, or at any other orientation where light from the object reaches the beamsplitter. Other objects such as three-dimensional objects may also be displayed by the apparatus by placing them in an equivalent position.

In a preferred embodiment, means for screening the retroreflector 6 from the object is provided, such as a louvre film 12 in front of the object 8. As indicated by arrows in FIG. 2, the beamsplitter 4 reflects light from the object 8 towards the retroreflector 6. In addition some of the light is transmitted by the beamsplitter 4 and is 'lost'. The beamsplitter 4 also transmits light reflected from the retroreflector 6 to form the suspended image 14 opposing the object 8 with respect to the beamsplitter 4. In addition, some of the light is reflected by the beamsplitter back towards the original image 8.

Figure 3:
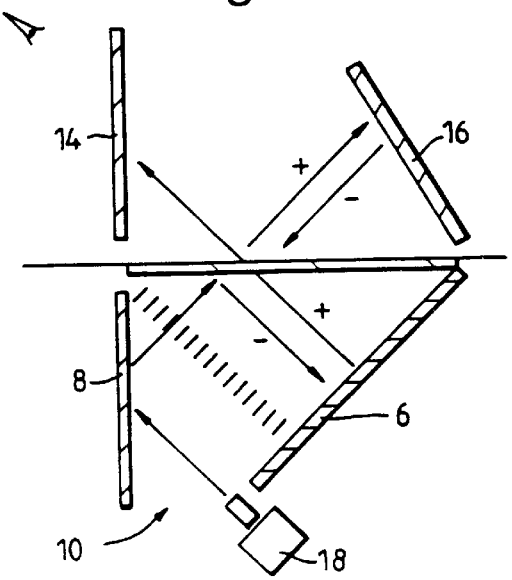
FIGS. 3, 4 and 5 are cross sectional side views of alternative arrangements.

In the embodiment shown in FIG. 3, a further array of retroreflectors 16 is positioned in a path for light which has been transmitted by the beamsplitter. In this example, the further array opposes the retroreflector 6 with respect to the beamsplitter 4; that is, it forms a triangular arrangement with the beamsplitter 4 and the suspended image 14. The further array of retroreflectors 16 directs light which is transmitted by the beamsplitter 4 directly from the original image 8 back towards the beamsplitter 4 to prevent 'loss' of this light. In an alternative embodiment of the invention, the array of retroreflectors 6 in a path for light which is reflected by the beamsplitter 4 could be omitted.

In the embodiment of FIG. 3, the object 8 is a projection screen, and an image is formed thereon by a projector 18. The projector 18 is shown positioned in the gap 10 between the retroreflector array 6 and the object 8, but may have other positions. For example it may be positioned in an aperture in the retroreflector array 6.

As indicated by plus and minus signs adjacent arrows in the Figure, the beamsplitter may be polarisation selective, transmitting light having one type of circular polarisation and reflecting light having the other type. For example, it may comprise layers of cholesteric liquid crystal polymers reflecting different spectral regions of circularly polarised light of one sense so as to reflect white light (i.e. the whole visible spectrum) of this sense.

Additionally, the object may be arranged to emit circularly polarised light, in which case one of the arrays 6, 16 may be omitted, since all of the light from the object could be of the type which is either reflected or is transmitted by the selective beamsplitter. This could be achieved by using a transmissive or reflective projection screen which either preserves or reverses polarisation, and a projector which produces linearly polarised light, such as an LCD projector, combined with a quarter wave plate. A transmissive such screen is disclosed in GB 1509180.

Figure 4:
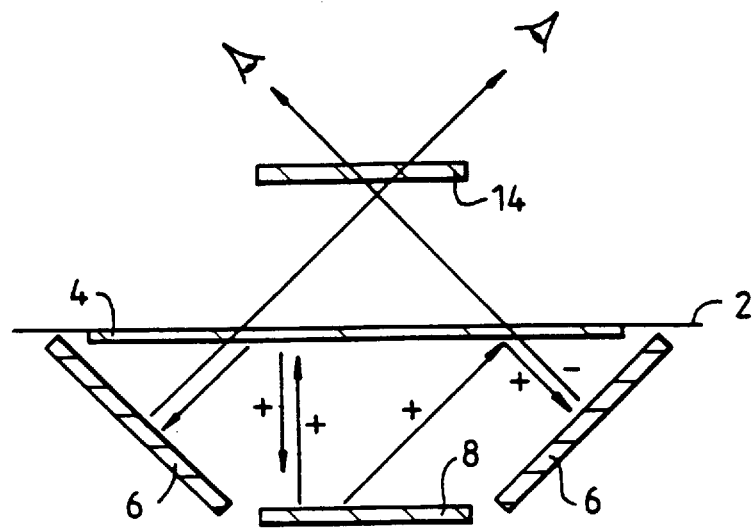

In the embodiment shown in FIG. 4, the retroreflector means comprises a pair of opposed retroreflector arrays 6 on opposite sides of the object 8, here shown as a VDU screen which is substantially parallel to the beamsplitter 4. The suspended image 14 may now be viewed from opposite directions as indicated by the arrows in the Figure. Modifications of this embodiment might include a curved array of retroreflectors having a frustoconical shape providing an image viewable all around. Alternatively such an array could have a plurality of facets allowing viewing from a plurality of predetermined directions.

In a similar manner to the embodiment of FIG. 3, further retroreflectors could be positioned in a path for light transmitted by the beamsplitter; that is on the same side of the beamsplitter as the suspended image 14, to prevent loss of some light.

If it is required that the object 8 be directly viewable through the beamsplitter 4, the beamsplitter may have an opaque area (not shown) directly above the object 8. Alternatively, the beamsplitter 4 could be polarization selective, and the object 8 could be arranged to emit circularly polarised light, as indicated by plus and minus signs adjacent the arrows in the Figure.

Figure 5:
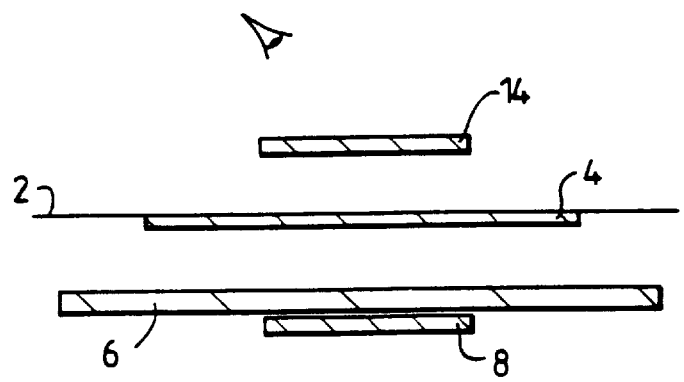

The embodiment of FIG. 5 is similar to that of FIG. 4, but uses a single retroreflector 6 which is parallel to the beamsplitter 4 and which is half-transparent so as to allow light from the object 8 to pass therethrough. In an alternative embodiment, there could be an aperture in the retroreflector 6 directly above the object 8 so that the retroreflector 6 need not be half-silvered.

We claim:

1. Apparatus for displaying an image of an object, comprising:

a beamsplitter positioned in a path for light from the object, and a retroreflector positioned in a path for light from the object which has been reflected by the beamsplitter, wherein the retroreflector comprises a plurality of retroreflective surfaces opposing one another such that the image may be viewed from a plurality of predetermined directions.

2. Apparatus as claimed in claim 1 in which the retroreflective surfaces lie on the same side of the beamsplitter as the object.

3. Apparatus as claimed in claim 1 in which the beamsplitter is mounted in an aperture in an opaque surface.

4. Apparatus as claimed in claim 2 in which the beamsplitter is mounted in an aperture in an opaque surface.

* * * * *